3,393,166
FLAME RETARDANT LATEX FOAM RUBBER OF A BLEND OF VINYLIDENE HALIDE HOMOPOLYMER AND RUBBERY VINYLIDENE HALIDE COPOLYMER

Walter A. Rupar, Sarnia, Ontario, Canada, assignor to Polymer Corporation, Limited, Sarnia, Ontario, Canada, a corporation of Canada
No Drawing. Filed Sept. 16, 1965, Ser. No. 487,902
Claims priority, application Canada, Oct. 1, 1964, 912,948
7 Claims. (Cl. 260—25)

ABSTRACT OF THE DISCLOSURE

A foam rubber composition may be manufactured so as to have a flame-retardant property when prepared from a latex blend having at least 60% solids when the blend consists of (1) a latex of homopolyvinylidene halide and (2) a coagglomerated latex mixture of (a) rubbery copolymer of a diene with vinylidene halide and (b) a homopolyvinylidene halide. The proportions of homopolymer and copolymer are such as to result in a total halogen content in the blend of from 30 to 43% per weight of total polymer.

---

This invention relates to a process for preparing latex foam rubbers and more particularly to latex foam rubbers which will not propagate combustion when the source of combustion has been removed.

Processes for producing latex foam rubbers are well known and include generally the steps of compounding a high solids latex with fillers, curatives, frothing agents etc. then foaming, irreversibly gelling and curing the gelled foam. Considerable variation is possible. There has been an increasing need for foam rubbers which are not only flexible and resilient, but which are also flame-retardant. Such materials are needed to provide the degree of safety required in uses such as cushioning in furniture and mattresses and in insulation applications. While most organic materials will burn if subjected to a high enough temperature for a sufficient length of time, there is nevertheless considerable variation in the degree of ability to resist propagation of a flame. Thus, in applications such as the foregoing, it is desirable to employ foam rubbers which resist burning when contacted with a flame and which do not burn when the flame source has been removed.

It has now been discovered that a flame-retardant latex foam rubber can be prepared by blending (1) an aqueous latex of particles of a vinylidene halide homopolymer with (2) an aqueous latex obtained by mixing (a) an aqueous latex of particles of a rubbery copolymer of an open-chain conjugated diolefin hydrocarbon compound and a vinylidene halide with (b) an aqueous latex of particles of a vinylidene halide homopolymer and coagglomerating the particles of latexes (a) and (b), concentrating the blend of latexes (1) and (2) to a 12 poise solids content of a least 60% and then subjecting the concentrated blend to compounding, foaming, gelling and vulcanization steps to obtain the foam rubber. To obtain suitable latex foam rubbers with flame retardance, the total halogen content of the polymers in the foam rubber should be between about 30–43 weight percent and preferably about 38% by weight of the total polymers in the foam rubber. The best flame retardant foam rubber has been obtained by coagglomerating about 15 parts by weight of the polymer particles of latex (2)(b) with each 100 parts by weight of the rubbery copolymer particles of latex (2)(a), blending in a further 10 parts by weight of the polymer particles of latex (1) and concentrating this blend, where the rubbery copolymer of (2)(a) is a copolymer comprising about 60 parts by weight of copolymerized butadiene-1,3 and 40 parts by weight of copolymerized vinylidene chloride and the homopolymer of latexes (1) and (2)(b) is homopolyvinylidene chloride.

To obtain suitable foam rubbers it is necessary to restrict the composition and usage ratios of the various components. Thus, the rubbery conjugated diolefin-vinylidene halide copolymer composition must contain no less than about 55 parts and no more than about 65 parts by weight of copolymerized diolefin and conversely no more than about 45 parts and no less than about 35 parts by weight of copolymerized vinylidene halide. If less than about 55 parts of copolymerized diolefin are present the latex foam rubber is not sufficiently rubbery for foam rubber applications, while if less than about 35 parts of copolymerized vinylidene chloride are present the good flame retardancy of the foam rubbers deteriorates to a point where the addition of larger amounts of the homopolyvinylidene chloride resin will not rectify it without causing the foam rubber to lose its rubbery properties. The total amount of homopolyvinylidene chloride added should be maintained at 10–35 parts by weight per 100 parts by weight of rubbery copolymer, with the smaller amounts being added when the copolymer contains the larger amount of copolymerized vinylidene chloride and the larger amounts being added when the copolymer contains the smaller amount of copolymerized vinylidene chloride. The general criterion for the homopolyvinylidene chloride is the maintenance of the total chlorine content in the total polymers in the latex foam rubber within the range of about 30–43 weight percent and preferably about 38%. Additionally, of the total vinylidene chloride homopolymer added to the copolymer latex, 5–20 parts and preferably 10–15 parts should be added prior to carrying out the agglomeration step in order to obtain best results. It has been found that the addition of small amounts of materials such as antimony trioxide, ammonium phosphate, kaolin clay, etc., during compounding supplies additional flame resistance to the latex foam rubbers of this invention.

In this specification the adaptability of a synthetic latex to concentration is gauged by the percent solids obtainable on concentration of the latex to a viscosity of 12 poises as measured at 25° C. on a Brookfield Model LVF Viscometer using the #3 spindle at 30 r.p.m. Thus the term "12 poise solids content of at least 60%" means that the latex blend must be capable of being concentrated to at least 60 weight percent solids content when the viscosity reaches 12 poises.

Polymerizable open-chain conjugated diolefin hydrocarbon compounds which may be used in preparing the rubbery copolymers include the $C_4$–$C_6$ dienes and substituted dienes such as butadiene-1,3, 2-methyl butadiene-1,3, 2,3-dimethyl butadiene-1,3, 2-chloro-butadiene-1,3, pentadiene-1,3 and hexadiene-1,3, while the vinylidene halide compounds include vinylidene chloride, vinylidene fluorochloride etc.

The conventional techniques of aqueous emulsion polymerization may be employed in preparing the homo- and copolymer latices. Briefly they consist in emulsifying in an aqueous medium the monomer or monomer mixture with an alkali metal soap of a $C_{12}$–$C_{18}$ acyclic monocarboxylic acid such as stearic or oleic acids, or an alkali metal soap of disportionated rosin acids, or synthetic emulsifiers such as alkyl aryl sulfonates, and initiating the polymerization reaction with a chemical such as potassium persulfate, hydrogen peroxide, or organic hydroperoxide such as cumene hydroperoxide, and regulating the molecular weight of the polymer so formed with a chain-transfer agent such as a $C_{10}$–$C_{16}$ mercaptan, e.g., n-dodecyl mercaptan. When copolymerizing butadiene-1,3 and vinylidene chloride a conversion of about 80% for a 55/45 charge ratio of butadiene/vinylidene chloride is a desirable point at which to stop polymerization to obtain a polymer having a desirable balance of properties. When homopolymerizing the vinylidene chloride, a suitable latex may be prepared at 120° F. (49° C.) by employing 2–3 times the conventional amount of catalyst and stopping the polymerization reaction at about 60–70% conversion. Higher conversions can result in failure due to rapid acidification and gellation. It is preferred that the polymerization of this monomer be conducted at a temperature above 90° F.

The coagglomeration of the polymer particles in the mixed vinylidene chloride-rubbery copolymer latices may be carried out by any of the conventional methods, i.e., freeze-thaw agglomeration, chemical agglomeration, etc., whereby the size of the particles in the latex mixture is increased sufficiently to enable subsequent concentration to a 12 poise solids content of at least 60% without causing the latex to coagulate. Concentration to 60–70% solids, as required for production of latex foam rubber, may be accomplished by processes such as swept film evaporation, rotating disc concentration, or centrifuging and creaming. It is usually desirable to adjust the pH of the individual latices to a value between about 10 to 12 before blending and agglomerating. Also, addition to the latex mixture of about 0.5 to 2 parts by weight of latex solids of a soap such as potassium oleate before the agglomeration step is carried out is often advisable to enhance the stability of the latex mixture to the conditions encountered during agglomeration.

After agglomerating the polymer particles in the latex mixture, the mixture is blended with a further quantity of a latex of polyvinylidene chloride and the blend is concentrated to the desired level. Minor proportions of a latex of another halogen-containing polymer such as poly-2-chlorobutadiene-1,3 and polyvinyl chloride may be included in the blend.

The concentrated latex blend may now be compounded by adding materials such as fillers, gelling agents, vulcanizing agents, accelerators, activators, etc.; foamed; gelled; and cured by conventional means. Of particular applicability to this invention, is the additional incorporation of flame-retardant chemicals such as chlorinated wax, antimony trioxide, ammonia phosphate or less expensive materials such as aluminum silicate clays known variously as kaolin, McNamee clay, etc., which confer further flame retardancy to the latex foam rubber products. The latex foam rubbers may also be treated by soaking in phosphate-containing solutions, ammonium sulfamate solutions, urea-formaldehyde and melamine-formaldehyde resin dispersions etc. to further enhance their flame retardancy.

Where reference is made in the examples to ASTM D–1692–59T, "Tentative Method of Test for Flammability of Plastics, Foams and Sheeting," the following notations apply:

The specimens, 2 x 6 x ½ inches, are supported by hardware cloth (e.g., a wire gauze) horizontally along their entire length. The height of the supporting gauze is adjusted so as to be ½ inch above the top of a Bunsen burner wing top. The burner is adjusted to give a blue flame whose visible portion is 1½ inches high, and the flame is set under one edge. At the end of 1 minute, or when the flame reaches the first inch gauge mark, the flame is removed.

If no flame or progressive glow is observed, the result is judged to be "nonburning" by this test. If the specimen continues to burn, the time (in seconds) of burning the 4 inches distance from the one inch gauge mark to the 5 inches/gauge mark is measured, and the burning rating in inches per minute is calculated by dividing the time in seconds into 240. If the specimen shows evidence of ignition or burns on exposure to the flame but does not burn past the 5 inches/second gauge mark, it will be judged "self-extinguishing" by this test.

The following examples are given by way of illustration:

EXAMPLE I

A latex containing a rubbery copolymer of butadiene-1,3 and vinylidene chloride was prepared using the following emulsion polymerization recipe:

| | Parts |
|---|---|
| Butadiene-1,3 | 55 |
| Vinylidene chloride | 45 |
| t-Dodecyl mercaptan | 0.03 |
| Potassium oleate | 3.5 |
| Daxad 11 SPN [1] | 0.1 |
| Trisodium phosphate | 0.4 |
| Potassium chloride | 0.4 |
| Potassium salt of EDTA [2] | 0.03 |
| $Na_2S_2O_4 \cdot 2H_2O$ | 0.02 |
| Water | 130 |
| $FeSO_4 \cdot 7H_2O$ | 0.008 |
| Sodium formaldehyde sulfoxylate | 0.03 |
| Trisodium phosphate | 0.03 |
| Diisopropylbenzene hydroperoxide | 0.35 |

[1] Daxad 11 SPN is a trademark for the sodium salt of the condensation product of beta-naphthalene sulfonic acid with formaldehyde.
[2] EDTA—ethylene diamine tetra acetic acid.

The reaction was conducted at 45° F. (7° C.) and was taken to 81.5 percent conversion of the monomers to polymer in about 12 hours, at which time about 0.15 part of dimethyl dithiocarbamate was added to stop the polymerization. The unreacted monomers were then removed by conventional flashing and steam distillation methods. By analysis, the copolymer was found to contain about 29% chlorine.

A second latex, containing a resinous homo-polymer of vinylidene chloride, was prepared at 122° F. (50° C.) using the following recipe:

| | Parts |
|---|---|
| Vinylidene chloride (inhibitor free) | 100 |
| Dresinate 214 (dry basis) [3] | 5.6 |
| Daxad 11 SPN | 1.0 |
| Sodium hydroxide | 0.8 |
| Water | 140 |
| Potassium persulphate | 0.5 |

[3] Dresinate 214 a trademark for the potassium soap of disproportioned wood rosin.

The polymerization of the resin was taken to 64 percent conversion of the monomer to polymer in about 12 hours. The reaction was terminated by carrying out the following steps: addition of 0.2 part of KOH as a 20% by weight aqueous solution, agitation of the latex for ¼ hour, and then addition of 1.5 parts of Dresinate 214 as a 15% by weight solution, agitation for ¼ hour, followed by 0.2 part of dimethyldithiocarbamate, all parts being based on 100 parts monomer of original polymerization charge.

The unreacted monomer was removed by conventional flash and steam distillations. This alkaline poly-vinylidene chloride resin latex remained fluid even after 90 days of storage—an important feature for a latex to be commercially useful. This latex was then mixed with the rubbery butadiene-vinylidene chloride copolymer latex in a total solids ratio of 15 parts by weight of polyvinylidene chloride per 100 parts by weight of rubbery copolymer. The pH of the resulting latex mixture was 10.3. The average size of the particles in the latex mixture was increased by a coagglomeration step effected by freezing the latex at about −30° F. (−34° C.) for about 2½ minutes and then thawing at 120° F. (49° C).

To the agglomerated rubbery copolymer-resin latex were further added 10 additional parts by weight of solids of the polyvinylidene chloride resin latex. This second latex blend was then concentrated to 63% by weight solids—which is equivalent to a 12 poise solids content of 65%. Where referred to in this and subsequent examples, the latex at this state will be referred to as "the final high solids latex blend."

A sample of latex foam rubber was prepared from a portion of this latex using the following formulation for compounding:

The foam rubber specimen of this invention was compared to a standard butadiene-styrene copolymer latex foam rubber and to a sponge prepared from a concentrated latex of the copolymer of butadiene-1,3 and vinylidene chloride. A comparison of the physical and flame retardance properties of the three specimens is shown in Table I.

TABLE I

| Latex foam rubber prepared from— | Percent Chlorine in Polymer | Tensile (p.s.i.) at 6.25 lb./cu. ft. | Percent Elongation | Percent Volume Shrinkage | Percent Compression Set | Flame Retardance |
|---|---|---|---|---|---|---|
| A..... Butadiene-Stryene (72/28) copolymer rubber plus polystyrene resin, ratio as in C. | 0 | 6.0 | 155 | 13.7 | 4.0 | Charred. |
| B..... Butadiene-VDC (55/45) Copolymer latex.. | 29 | 4.2 | 137 | 17 | 9.3 | Fair. |
| C [1]... Copolymer- resin blend, coagglomerated, and then additional VDC resin latex added. | 38 | 6.5 | 212 | 17.6 | 10.5 | Good. |

[1] That is, 100 parts of the rubbery butadiene/vinylidene chloride copolymer latex in B to which was added 15 parts of the aforedescribed vinylidene cholride (VDC) resin latex. This was coagglomerated. Then to this coagglomerated latex blend was added a further 10 parts of VDC resin latex. All parts were parts by weight of latex solids.

```
                                          Parts by weight,
                                          dry solids basis
Latex _____ 100
Potassium oleate-castorate mixed soap (50/50) ____ 1.0
Casein _____ 0.25
Sulphur (water dispersion) _____ 2.25
Zinc diethyl dithiocarbamate _____ 0.50
Antioxidant "2246" [4] _____ 0.75
Trimene base [5] _____ 0.87
```

[4] Antioxidant "2246": trademark for a 2,2-methylene-bis-4-methyl-6-tertiary-butyl phenol.
[5] Trimene base: trademark for the reaction product of ethyl chloride, formaldehyde and ammonia.

EXAMPLE II

Further samples from the final high solids latex blend C of Example I, Table I, were made into foam rubber specimens as in Example I but the compounding of this present example included additional materials added as fine powders after maturing of the latex compound. The amounts of these flame retardant powders and the results of the physical and flame retardance tests are shown in Table II.

TABLE II

| Additional Materials Added | Amounts per 100 parts latex solids, parts | Tensile, 6.25 lbs.per cu. ft. | Percent Elongation | Volume Shrinkage, Percent | Compression Set, Percent | Flame Retardance |
|---|---|---|---|---|---|---|
| Antimony Trioxide......... | 10 | 6.2 | 229 | 17.3 | 10.9 | Excellent. |
| Niax Flame Retardant A [a]_ | 10 | 4.1 | 255 | 17.0 | 14.9 | Do. |
| McNamee Clay [b]......... | 10 | 6.4 | 274 | 17.2 | 15.8 | Do. |

[a] Niax Flame Retardant A = Trademark for a material believed to contain polyvinyl chloride and antimony trioxide.
[b] McNamee Clay = Trademark for a hydrated aluminum silicate having a particle size such that 99% will pass through a 300 mesh screen.

These ingredients were intimately blended with the latex, the container covered, and the compound allowed to mature for 20 hours in an air conditioned room maintained at 77° F. and 50% relative humidity.

The compound was then foamed and gelled in an A–200 Model Hobart mixer after adding the following additional ingredients in the order indicated to complete the compounding:

EXAMPLE III

The procedure of Example II was repeated with newly prepared samples of the rubbery copolymer and resin latices using Chlorowax 70 and antimony trioxide in each sample. Excellent flame retardance was obtained with retention of adequate physical properties in the latex foam rubbers as indicated in Table III. Chlorowax 70 is the trademark for a solid chlorinated paraffin containing about 70% chlorine.

TABLE III

| Parts of chlorinated wax/100 parts latex solids | Parts of antimony trioxide/100 parts latex solids | Tensile, 6.25 lbs./cu. ft. | Percent Elongation | Percent Volume Shrinkage | Percent Compression Set | Flame Retardance |
|---|---|---|---|---|---|---|
| 0 | 0 | 7.2 | 270 | 18.1 | 8.9 | On threshhold of flame retardance. |
| 5 | 10 | 7.3 | 265 | 21.1 | 9.9 | Self-extinguishing on removal from flame. |
| 10 | 15 | 4.5 | 265 | 17.3 | 12.6 | Do. |

```
Potassium oleate-castorate mixed soap (50/50) ____ 1.0
Zinc oxide (water dispersion) _____ 3.0
Zinc 2-mercaptobenzothiazole _____ 1.0
Sodium silicofluoride (water dispersion) _____ 2.0
```

Within one minute of stopping the mixer, two moulds measuring 8 x 6 x 1 inches were filled and closed. After the latex compound had gelled, the moulds were placed in a curing bath maintained at 205° F. for 45 minutes. The cured latex foam rubber was then stripped from the mould, washed with 100° F. water, squeezed, and dried at 180° F. for 1¾ hours.

EXAMPLE IV

The procedure of Example I was repeated except that 3 parts of petrolatum plastizer in the form of an aqueous dispersion were added to the matured compounded concentrated latex prior to completion of the compounding. The dispersion was prepared as follows:

To 60 parts by weight of water were added under good agitation 4.5 (dry) parts by weight of ammonium caseinate (as a 15% aqueous solution), 1.0 part (dry) of a sodium lauryl sulphate (available under the trademark Aquarex D) added as a 10% aqueous solution, oleic acid 7 parts, and triethanolamine 8 parts. To the agitated aqueous mixture petrolatum was added at 160° F. The dispersion was kept under agitation for about 30 minutes.

The compression set of the foam rubber specimen was lowered to 6.4% while maintaining other properties favorable, i.e., tensile 5.0, elongation 208%, volume shrinkage 17.7%. Flammability tests, using the ASTM method D–1692–59T previously referred to, showed a flame retardance rating of "self-extinguishing."

EXAMPLE V

A series of latex foam rubbers were prepared and evaluated for flame retardance and burning rate by ASTM method D–1692–59T. These samples ranged from foam rubbers having no flame retardance and a high burning rate to those having positive flame retardance and ratings of "nonburning." All samples were prepared by the compounding procedure set out in Example I with deviations being noted.

The results are summarized in Table IV.

4. A process comprising (1) mixing (a) an aqueous latex of a rubbery copolymer of 55–65 parts by weight of an open-chain conjugated diolefin compound and 45–35 parts by weight of a vinylidene halide, with (b) an aqueous latex of particles of a vinylidene halide homopolymer in the amount of 5 to 20 parts homopolymer by weight per 100 parts by weight rubbery copolymer; (2) coagglomerating the particles in the latex mixture; (3) blending an aqueous latex of particles of a vinylidene halide homopolymer into the latex mixture containing the coagglomerated particles in the amount of 5 to 20 parts homopolymer per 100 parts by weight rubbery copolymer, the total resinous vinylidene halide homopolymer in the latex blend being 10 to 35 parts by weight per 100 parts by weight of the rubbery copolymer such as to give a total halogen content in the polymers of 30 to 43% by weight of the total polymer particles in the latex blend; (4) concentrating the latex blend to a 12 poise solids content of at least 60%; and (5) compounding, foaming, gelling, and vulcanizing the concentrated latex blend to obtain a foam rubber.

TABLE IV

| Sample Identification | Latex from Which Foam Prepared | Foam Rubber Density, lbs./cu. ft. | Rating by ASTM D–1692–59T | |
|---|---|---|---|---|
| | | | Flame Retardance | Burning Rate, inches per minute |
| V–(a) | A butadiene-styrene (72/28) described in Example I | 6.0 | None | 8. |
| V–(b) | Natural latex | 6.2 | do | 6. |
| V–(c) | A copolymer of butadiene-vinylidene chloride (64/36) prepared similarly to the 55/45 copolymer described in Example I. | 8.1 | do | 4. |
| V–(d) | Copolymer 55/45 butadiene-vinylidene chloride of Example I | 9.6 | do | 1.6. |
| V–(e) | A latex blend of 100 parts of the 55/45 copolymer plus 15 parts of the vinylidene chloride resin latex of Example I, said parts based on dry latex solids, which latex blend was then coagglomerated by a freeze-thaw method. | 8.3 | do | 1.1. |
| V–(f) | Same as V–(e) but with 5 parts Chlorowax 70 and 10 parts Sb₂O₃ added | 7.8 | Yes | "Self-Extinguishing." |
| V–(g) | Same as V–(e) but with 10 parts Chlorowax 70 and 15 parts Sb₂O₃ added | 8.5 | Yes | "Non-Burning." |
| V–(h) | The latex blend of V–(e) which was coagglomerated by a freeze-thaw method, and then into which were blended 10 further parts of vinylidene chloride latex. | 7.1 | Yes | Do. |
| V–(i) | Same as V–(h) but with 10 parts McNamee clay added | 6.6 | Yes | "Self-Extinguishing." |
| V–(j) | Same as V–(h) but with 10 parts Niax A added | 7.6 | Yes | "Non-Burning." |

What is claimed is:

1. A flame retardant latex foam rubber prepared from a concentrated latex blend comprising (1) an aqueous latex of particles of a vinylidene halide homopolymer, and (2) an aqueous latex of coagglomerated particles of (a) a rubbery copolymer of 55–65 parts by weight of an open-chain conjugated diolefin hydrocarbon compound with 45–35 parts by weight vinylidene halide and (b) a vinylidene halide homopolymer in the amount of 5 to 20 parts homopolymer by weight per 100 parts by weight rubbery copolymer, said latex blend having been concentrated to a 12 poise solids content of at least 60%, the total resinous vinylidene halide homopolymer in the said concentrated latex blend being 10 to 35 parts by weight per 100 parts by weight of the rubbery copolymer, the total halogen content of the polymers in said concentrated latex blend being about 30 to 43% by weight of the total polymers contained therein.

2. A composition according to claim 1 wherein the vinylidene halide homopolymer of (1) and (2)(b) is homopolyvinylidene chloride and wherein the rubbery copolymer (2)(a) is a copolymer of butadiene-1,3 and vinylidene chloride.

3. A composition according to claim 2 wherein 0.5–15 parts by weight, per 100 parts by weight of total polymer content, of a flame retardant compound are also contained therein.

5. A process according to claim 4 wherein the homopolymer of (1)(b) and (3) is a homopolyvinylidene chloride, and wherein the rubbery copolymer of (1)(a) is a copolymer of butadiene-1,3 and vinylidene chloride.

6. A process according to claim 5 wherein the mixing step in (1) mixes about 15 parts by weight of particles of vinylidene chloride homopolymer (1)(b) per 100 parts by weight of particles of rubbery copolymer in (1)(a); and wherein the blending in step (3) is such as to give a total of about 25 parts by weight of vinylidene chloride homopolymer per 100 parts by weight of rubbery copolymer (1)(a) in the latex blend.

7. A process according to claim 5 wherein 0.5–15 parts by weight, per 100 parts by weight of total polymer content, of a flame retardant compound are also incorporated therein.

References Cited

UNITED STATES PATENTS 2,761,001  8/1956  Eckert _____ 260—2.5
2,991,270  7/1961  Roper et al. _____ 260—890

FOREIGN PATENTS 635,986  4/1950  Great Britain.

MURRAY TILLMAN, *Primary Examiner.*

W. J. BRIGGS, *Assistant Examiner.*